United States Patent [19]

Gohier

[11] Patent Number: 4,949,986
[45] Date of Patent: Aug. 21, 1990

[54] BODY AND UNDERCARRIAGE FOR INTERCONNECTABLE BAGGAGE CARTS

[75] Inventor: Pierre R. Gohier, Midvale, Utah
[73] Assignee: United Tractor Company, Cleveland, Ohio
[21] Appl. No.: 235,705
[22] Filed: Aug. 19, 1988

Related U.S. Application Data

[63] Continuation of Ser. No. 911,582, Sep. 24, 1986, abandoned.

[51] Int. Cl.[5] .................. B62D 13/00; B62D 53/00
[52] U.S. Cl. ................................ 280/410; 280/419; 280/444; 280/800; 296/901; 296/29
[58] Field of Search ............... 280/442, 444, 419, 408, 280/410, 786, 799, 800, 47.34, 86, 411.1, 441.1, 423.1, 81.1, 81.6; 296/181, 182, 196, 197, 203, 204, 29, 30, 901

[56] References Cited

U.S. PATENT DOCUMENTS

| | | | |
|---|---|---|---|
| 1,868,912 | 7/1932 | Plank | 280/81 B |
| 2,168,147 | 8/1939 | Arehart | 280/442 |
| 3,313,378 | 4/1967 | Freeman et al. | 280/47.34 X |
| 3,575,444 | 4/1971 | Veenema | 280/408 |
| 3,637,236 | 1/1972 | Shimoji et al. | 280/419 |
| 3,712,005 | 1/1973 | Eschbach et al. | 296/31 P X |
| 3,772,997 | 11/1973 | Heap et al. | 296/29 |
| 3,811,721 | 5/1974 | Bolesky | 296/31 P X |
| 4,316,305 | 2/1982 | Seaford | 16/21 |
| 4,431,368 | 2/1984 | Katz et al. | 280/408 X |
| 4,592,585 | 6/1986 | Oren et al. | 296/181 |

FOREIGN PATENT DOCUMENTS

| | | | |
|---|---|---|---|
| 67539/65 | 3/1968 | Australia | 280/444 |
| 199516 | 2/1958 | Fed. Rep. of Germany | 280/444 |
| 1133640 | 7/1962 | Fed. Rep. of Germany | 296/31 P |
| 429870 | 2/1948 | Italy | 280/442 |
| 0901134 | 1/1982 | U.S.S.R. | 280/419 |

Primary Examiner—Charles A. Marmor
Assistant Examiner—Brian L. Johnson
Attorney, Agent, or Firm—Fay, Sharpe, Beall, Fagan, Minnich & McKee

[57] ABSTRACT

A baggage cart intended to be selectively coupled to other carts to form a train of carts comprises a body and an undercarriage supporting the body. The body includes a double-walled plastic floor, a double-walled plastic roof, and a pair of double-walled plastic end members. Each of the end members has integral lower and upper extension portions extending toward and being fastened with the longitudinal ends of the floor and roof, respectively. The undercarriage includes a plurality of metal stringer members extending substantially the length of the body and attached thereto. A tower assembly is secured to the stringer members, and a steerable front axle assembly is disposed beneath the tower assembly, with a bearing member interconnecting the tower assembly and front axle assembly such that the front axle assembly is rotatable relative to the tower assembly. The baggage cart further comprises a tow bar pivotally secured to the front axle assembly, a rear axle assembly attached to the stringer members, and a hitch attached to the stringer members and capable of releasably securing one of the other carts. The inner walls of the floor and roof include conically shaped depressions having complementary-shaped spacers or plugs disposed therein. In addition, a plurality of metal tubes are supported between sockets formed in the end members, and a plastic shelf extends over and is supported by the metal tubes. The baggage cart also comprises a brake arrangement operated by the tow bar. Furthermore, a method of assembling the cart body and securing the cart body to the undercarriage is disclosed.

2 Claims, 5 Drawing Sheets

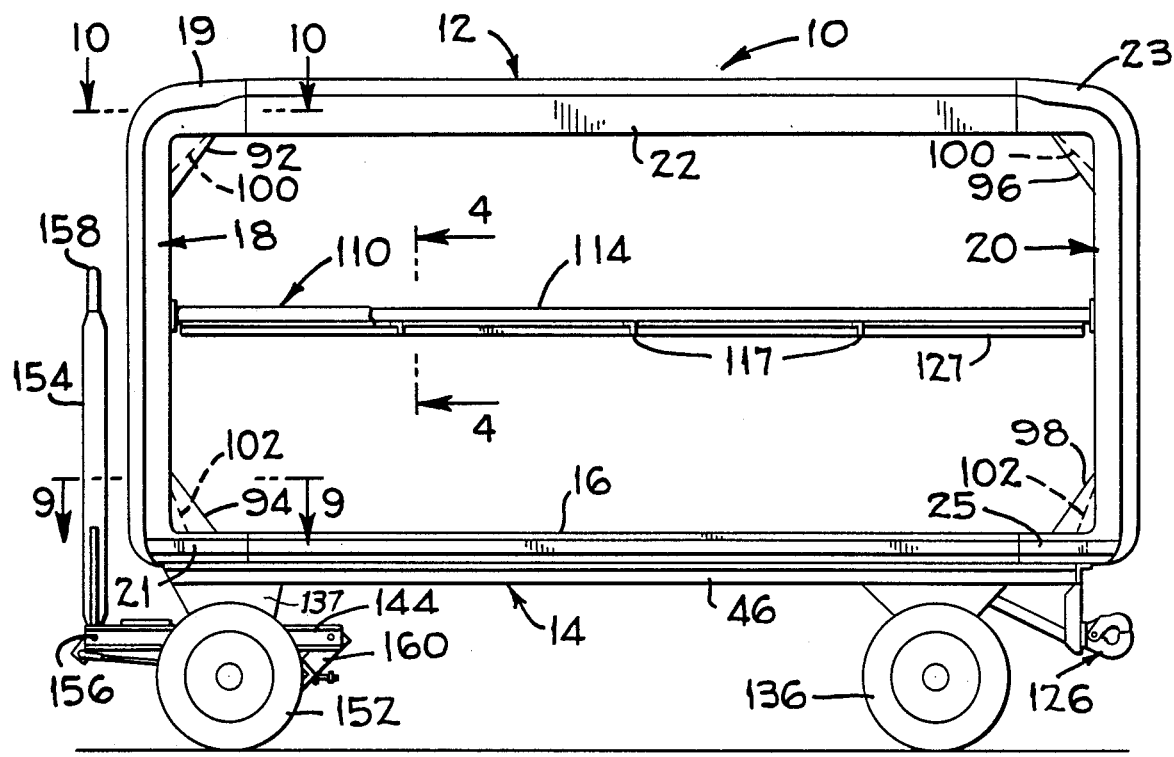
FIG_1
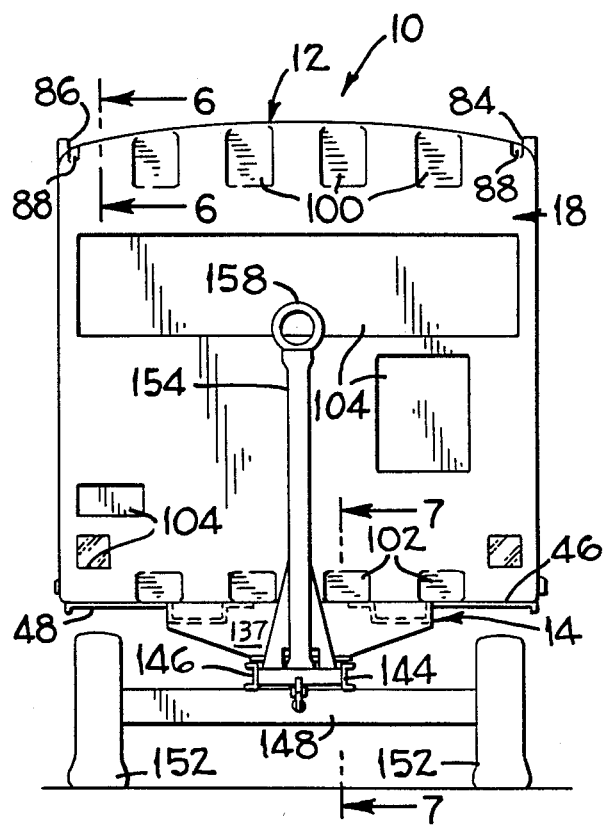
FIG_2
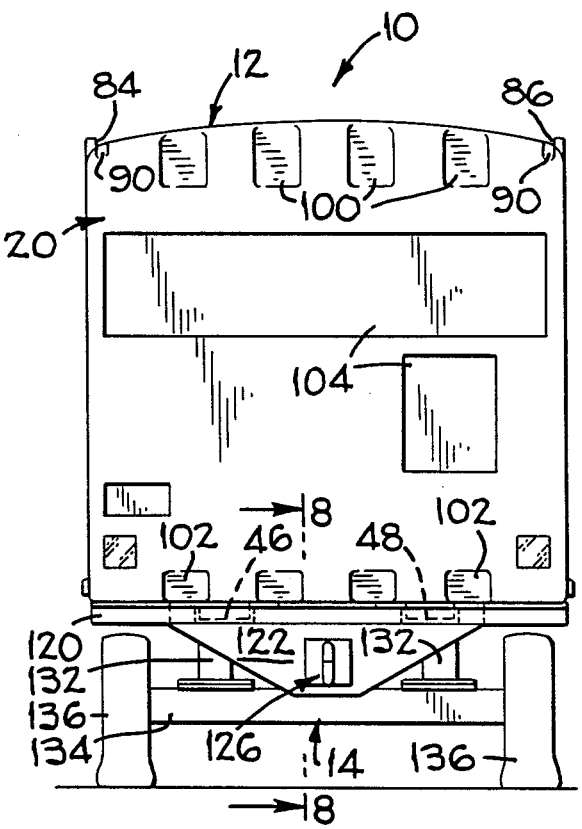
FIG_3

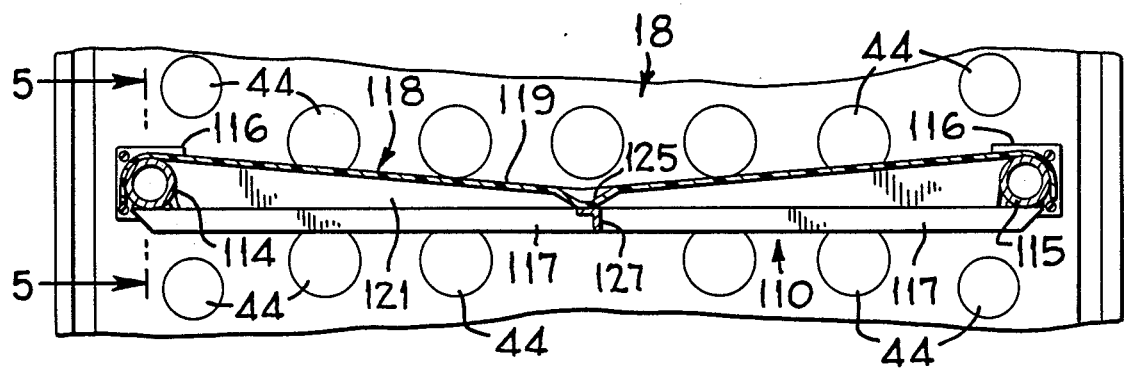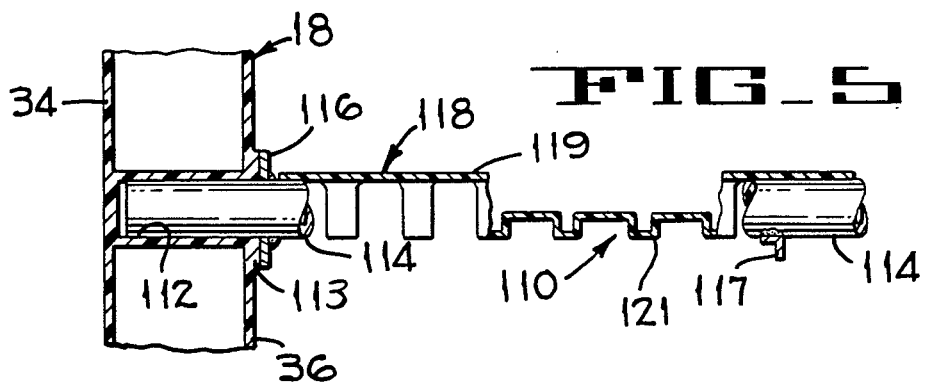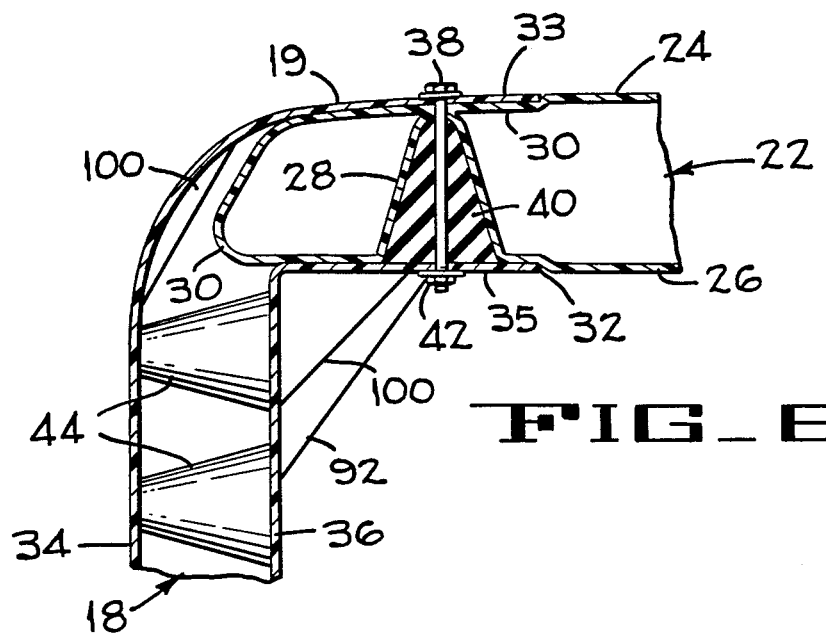

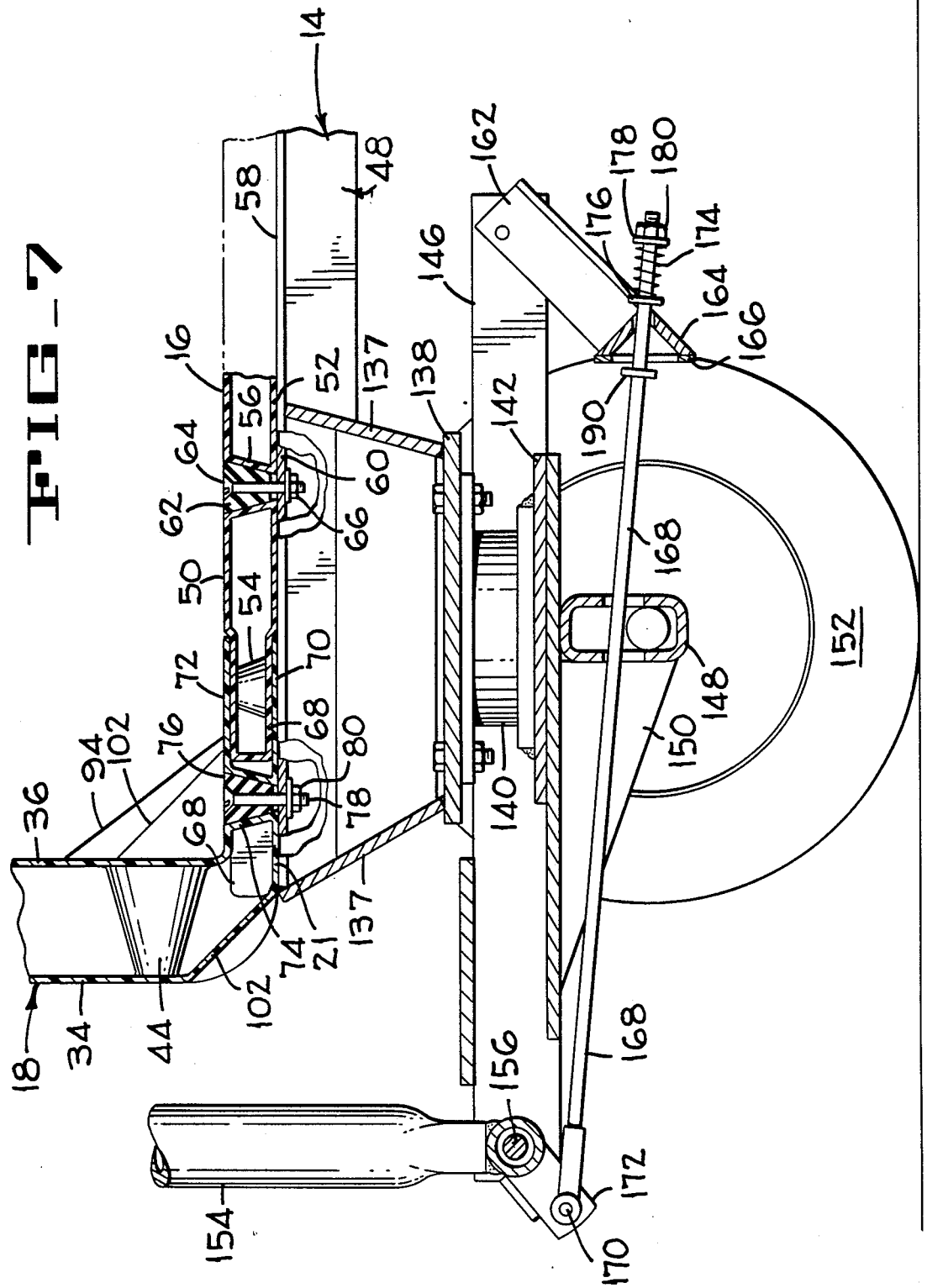

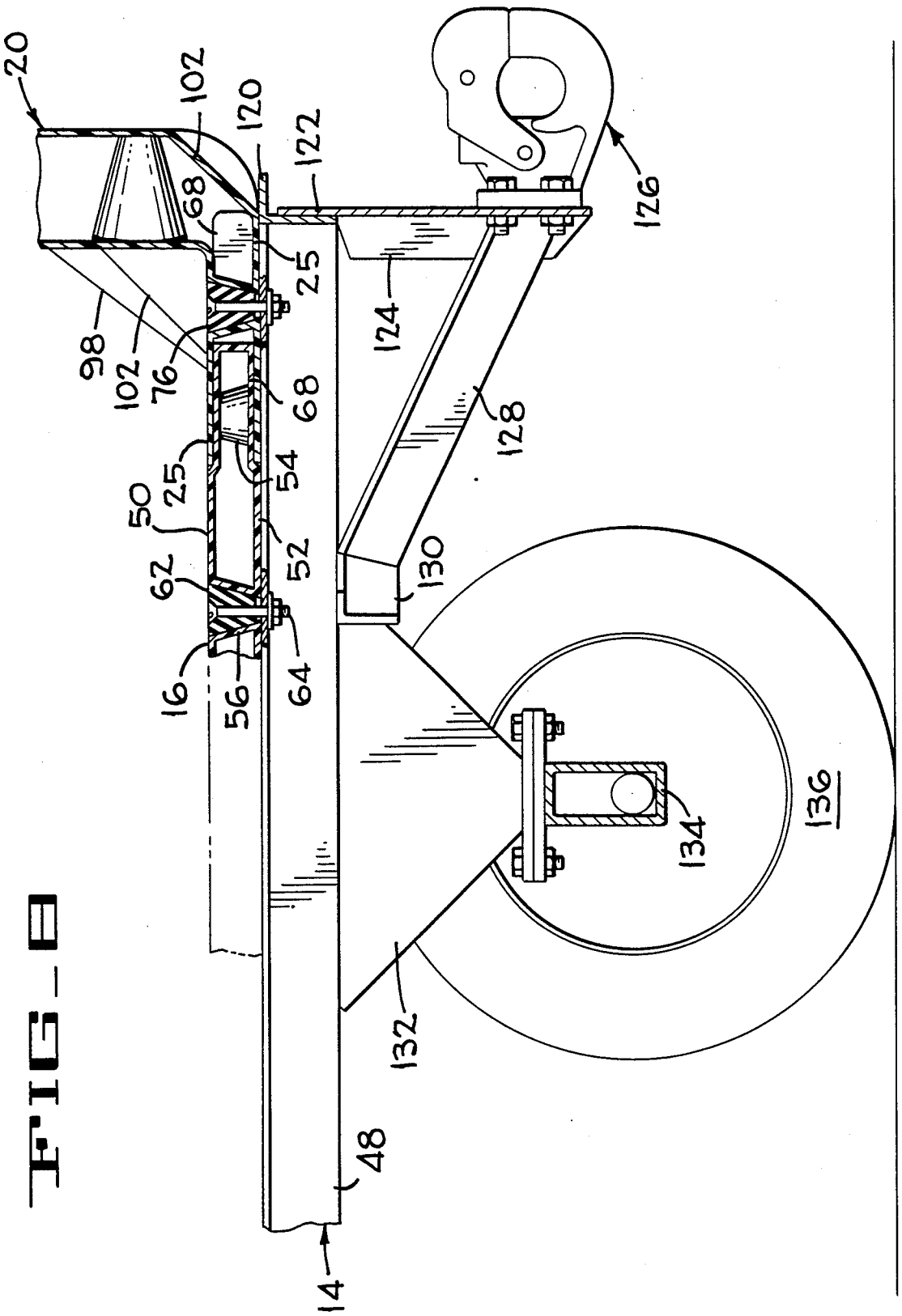

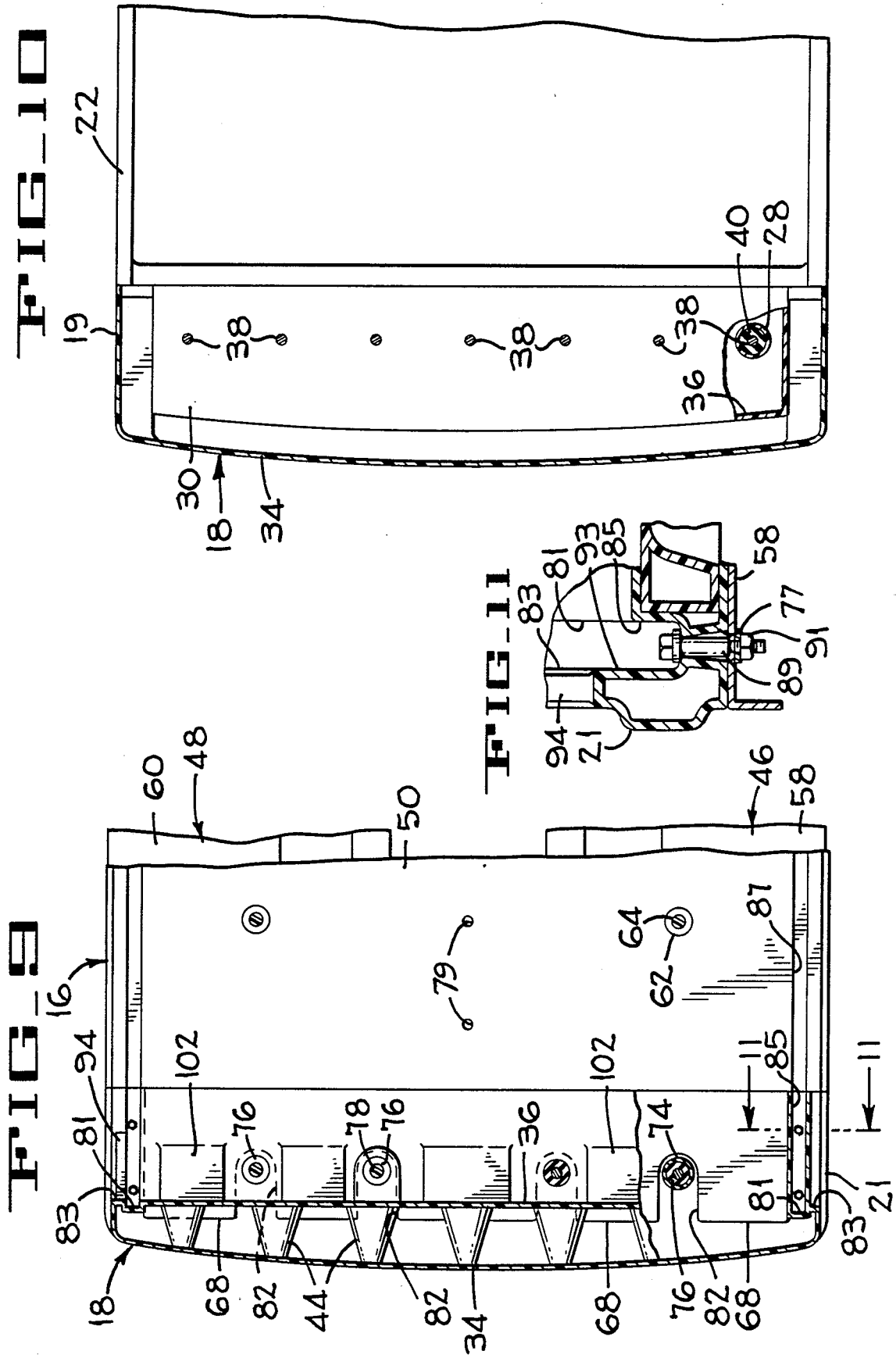

BODY AND UNDERCARRIAGE FOR INTERCONNECTABLE BAGGAGE CARTS

This application is a continuation of application Ser. No. 911,582, filed Sept. 24, 1986, now abandoned.

This invention relates to wheeled carts generally, and more particularly, to baggage carts, i.e., that type of cart used to transport luggage, packages and the like between aircraft and airport terminal facilities.

Baggage carts are typically subjected to rather severe use which results in dents and scratches. These carts, though often serviceable, must frequently be repaired and painted in order to present an acceptable appearance. The cost of maintenance is, therefore, relatively high for such a mechanically simple apparatus. The cost of shipment from place of manufacture to the airport facility for ultimate use is also inordinately high because the bulk of the shipped unit is high in relation to its weight.

The present invention solves or minimizes these problems by providing a baggage cart body that is rugged and durable but which may be quickly and easily repaired when damaged, does not require painting, and will not rust or corrode. The present invention also provides an under carriage for a baggage cart which permits unrestricted steering and which withstands forces imposed by trailing carts without transfer of such forces to the body. The baggage cart of the present invention permits shipping in a relatively small and compact volume, as well as easy assembly at the site of use. These and other advantages of the present invention will become more readily apparent from a perusal of the following description and the accompanying drawings, wherein:

FIG. 1 is a side elevational view of a baggage cart according to the present invention;

FIG. 2 is a front elevational view of the baggage cart in FIG. 1;

FIG. 3 is a rear elevational view of the baggage cart in FIG. 1;

FIG. 4 is a sectional view taken on line 4—4 of FIG. 1;

FIG. 5 is a sectional view taken on line 5—5 of FIG. 4;

FIG. 6 is a sectional view taken on line 6—6 of FIG. 2;

FIG. 7 is a sectional view taken on line 7—7 of FIG. 2;

FIG. 8 is a sectional view taken on line 8—8 of FIG. 3;

FIG. 9 is a sectional view, with portions broken away, taken on line 9—9 of FIG. 1;

FIG. 10 is a sectional view, with portions broken away, taken on line 10—10 of FIG. 1; and FIG. 11 is a sectional view taken on line 11—11 of FIG. 9.

Referring to FIGS. 1-3, there is shown a baggage cart, indicated generally at 10, which includes a body 12 mounted on an undercarriage 14. The body 12 is assembled from a floor member 16, front and rear end members 18 and 20, respectively, and roof member 22. The front end member 18 terminates in an upper, rearwardly-extending projection 19 and a lower, rearwardly-extending projection 21. Similarly, the rear end member 20 terminates in an upper, forwardly-extending projection 23 and a lower, forwardly-extending projection 25. Each of these members, 16, 18, 20 and 22, is molded from a plastic material, such as polyethylene, for example, by a process commonly called rotomolding, and is formed with a double-walled construction. Cross-linked polyethylene is preferred because it will produce a relatively flexible structure which is less likely to fracture on impact and which is less likely to damage aircraft in the event of incidental contact therewith. The roof member 22 is molded with an upper wall 24, as shown in FIG. 6, and a lower wall 26. The lower wall 26 is provided with a plurality of conically-shaped indentations, commonly called kiss-offs, which extend to and join with the upper wall 24; one such kiss-off being shown at 28. The fore and aft ends of the roof 22 are each provided with a tongue of both reduced overall thickness and reduced width. The tongues on the fore and aft ends of the roof member 22 are complementary with and fit snugly into a groove formed at the top of each of the front and rear end members 18 and 20. Since the connection of the roof to each of the front and rear end members is similar, a description of the connection of the roof member 22 with the front end member 18, which connection is shown in FIG. 6, will suffice for an understanding of the roof member to rear end member connection. An open groove 32 is formed at the top of the front end member 18 by the rearward angled extensions 33 and 35 of both the outer wall 34 and the inner wall 36 respectively of the front end member 18. The tongue 30 fits into the groove 32 and is fastened therein by a row of bolts 38, each passing through aligned holes in the extensions 33 and 35 and a hole through the apex of kiss-off 28 formed in the tongue 30. A centrally-bored spacer or plug 40, having a shape complementary with the kiss-off 28, is positioned in each of the kiss-offs 28 to prevent crushing the groove 32 and the tongue 30 when the bolt 38 is threaded into engagement with a nut 42. The spacer 40 is preferably made of a hard rubber material having a hardness as measured by a"; durometer in the range of 70 to 110, but preferably 90, which can deform slightly under the compressive load of the nut and bolt to conform the spacer to the contours of the associated kiss-off and thereby distribute the compressive load over a wider area. Washers between the extensions 33 and 35 and the nut and bolt also may be used to distribute the load. The tongue 30 is preferably reduced in overall thickness, i.e. offset, at the top an amount sufficient to align the outer surface of the upper wall 24 of the roof with the outer surface of the angled outer wall extension 33 of the end member 18 for a smoother and more attractive appearance. The tongue 30 is also reduced in overall thickness at its lower edge an amount sufficient to provide, in cooperation with the top offset, a guide for engagement of the ends of the extensions forming groove 32 with tongue 30 and thereby assist in aligning the holes in the sides of the groove with the holes in the apex of the kiss-offs 28 to facilitate insertion of the bolts 38.

The connections of the end members 18 and 20 to the floor 16 and the undercarriage 14 are similar and a description of only the front end member thereto will suffice for an understanding of both. The undercarriage is provided with a pair of stringers 46 and 48 which extend substantially the length of the body 12. The floor 16 has an upper wall 50 and a lower wall 52 with a plurality of conically-shaped kiss-offs 54 extending from the lower wall 52 to and into contact with the upper wall 50. In addition to the kiss-offs 54, a plurality of kiss-throughs 56 are arranged in two rows, one row over each of the outward projecting flanges 58 and 60 of the stringers 46 and 48 respectively. The kiss-throughs 56 have inverted, frusto-conical walls molded in situ with, and joining the upper and lower walls. A complementary-shaped plug 62 is inserted into each kiss-through 56 and has a countersunk central bore to accept a flat-headed bolt 64. The plug 62 is made of a hard rubber material similar to the material used for the spacer 40 and extends through the associated kiss-through but not into direct engagement with the flange 58 or 60, the smallest diameter of the plug 62 being larger than the smallest diameter of the kiss-through 56. The bolt 64 also extends through a hole in the associated flange and a washer, to threadedly engage a nut 66. When the bolt and nut are tightened, the rubber plug 62 is wedged into tight engagement with the kiss-through to hold the floor 16 securely to the stringers 46 and 48. The floor 16 also includes a tongue on each end, the forward tongue being shown at 68, of reduced overall thickness and width. The tongue 68 fits into a groove formed by the inward projections 70 and 72 of the lower ends of the outer and inner walls 34 and 36 respectively. The tongue 68 mates snugly with the groove formed by the projections 70 and 72 with both the upper and lower surfaces of the resulting joint being smooth and in the same plane. There is no connection between the floor member 16 and the end member 18 other than the snug fit of the tongue and groove connection described above. Instead, the inward projections 70 and 72 are provided with a row of kiss-throughs 74, similar to kiss-through 56, extending along the front of the body 12. A hard rubber plug 76, similar to plug 62, is inserted in each kiss-through 74 with a flat-headed bolt 78 extending through the plug 76 and appropriately positioned holes in the flanges of the stringers 46 and 48. A nut 80 threadedly engages each bolt 78 and fastens the end wall 18 to the stringers 46 and 48 in the same manner as the floor 16 is attached thereto. The leading edge of the tongue 68 is notched, as indicated at 82 in FIG. 9, at each of the kiss-throughs 74 to permit the tongue 68 to penetrate as deeply as possible into the groove formed by the projections 70 and 72. The floor member 16 is therefore positively fastened to the undercarriage 14 as are the end members, while still permitting the end members to flex and move slightly relative to the floor member.

The end members 18 and 20 are the only structural members supporting the roof member 22. Starting and stopping the cart 10 will impose bending loads on the end members as a function of the acceleration forces, the mass of the roof member 22 and the distance of the roof vertically above the stringers 46 and 48. These bending loads are not as significant, however, as the bending loads imposed by luggage and the like carried within the body, especially when such luggage is supported on a shelf suspended between the end members intermediate their vertical height. Even in the absence of movement, any static load carried by a shelf, to be described hereinafter, must be transmitted by the end members 18 and 20 to the undercarriage 14. The outer corners of the end members are important factors in resisting both the bending movements created by acceleration and static loads resulting from luggage supported on a shelf. One reason is the shape of the cross-section, i.e., the moment of inertia of the outer corner, which is created by a vertical groove or channels such as is shown at 81 in FIGS. 9 and 11, forming an outer flange 83. The vertical channel 81 meets and is contiguous with a groove 85 formed in the rearward-extending lower projection 21. The groove 85 is also contiguous with a groove 87 formed in the floor member 16. Similar grooves are formed in the upper projections and the roof members and are arranged to accept and retain a suitable track for suspension of a curtain to cover the openings in the sides of the body 12. The groove 85, which is exemplary, is provided with a pair of kiss-throughs, one of which is shown at 77 in FIG. 11. A shoulder bolt 89 extends through the kiss-through 77 and an aligned hole formed in the outer flange 58 and engages a nut 91. The length of the shoulder on the bolt 89 is just slightly less than the thickness or height of the kiss-through 77 so that the outer edge of the lower projection 21 is held securely to the flange 58 without crushing the projection in the area of the kiss-through 77. A gusset 94 extends from the outer flange 83 and a flange 93 formed on the projection 21 by the groove 85. Gussets are also provided at 92 where corresponding portions of the vertical front end member 18 and the upper projection 19 meet and at 96 and 98 for the junction of the rear member 20 with upper and lower projections 23 and 25 respectively.

The body 12 is thus assembled from four components—a floor member 16, front and rear members 18 and 20 respectively, and a roof member 22. Except for the fastener means, the basic body is composed entirely of plastic molded parts, which permits any desired color to be incorporated during the molding operation. Incorporation of the color during the molding operation provides a structure in which minor stratches and nicks will be less noticeable. The hollow double-walled construction with uniformly distributed kiss-offs connecting the two walls provides a light weight, yet strong and durable body. The roof 12 may be rounded or pitched to the outside to shed rain, as shown in FIGS. 2 and 3, with rain gutters 84 and 86 molded along the outer edges to prevent water from running onto the baggage or personnel loading and unloading it. The gutters lead into channels 88 and 90 molded in the outer surface of the top of the end members 18 and 20 respectively to direct water away from the baggage area. Any water that does enter the body 12 will drain through holes 79 extending through floor member 16. The holes 79 are formed like the kiss-throughs but have cylindrical walls and are positioned along the center of the floor which is pitched or sloped downward toward the center to assist not only with drainage but also in retaining baggage during transit. The rain gutter 86 also provides stiffness and strength to the roof member 22. The two end members 18 and 20 are essentially C-shaped when viewed from the side and are stiffened by gussets 92, 94, 96 and 98 positioned at the outside corners to tie the vertical portion into the horizontal portion of each end member. Additionally, the rounded outer corners of each end member are interrupted with angled flat portions 100 at the top and 102 at the bottom. The end members may also be molded with defined areas, on the outer vertical surfaces, which are slightly depressed and of a smoother texture, such as indicated at 104, for the mounting of reflectors, and/or the application of decals or the like to identify the airline and the particular cart.

A shelf, indicated generally at 110 in FIGS. 4 and 5, is suspended between the end members 18 and 20. Each of the end members 18 and 20 are provided with two molded sockets 112. Two metal tubes 114 and 115 span the end members with their ends positioned in the aligned sockets 112. A metal grid 117, including a central spine member 127, is secured to and suspended below the tubes 114 and 115, and provides a level bridge spanning and inter-connecting the tubes 114 and 115. A flange 116 is attached near each end of the tubes 114 and 115, which flanges are fastened to a boss 113 molded into the inner wall 36 around the sockets 112. A shelf member 118 which may be molded of double-walled plastic with a smooth upper wall 119 and a fluted or corrugated lower wall 121 hooks over the two tubes and rests upon the grid 117. The upper wall slopes downward toward the center to assist in retaining luggage during transit and to direct rain water toward a central trough 125 for controlled disposal.

The undercarriage 14 includes the two stringers 46 and 48 which are spaced apart and run fore and aft substantially the length of the body 12. Each stringer has an inverted hat cross section for bending strength with a short inward projecting flange and a longer outer projecting flange terminating in a downward projecting lip along the outer edges. The lip is positioned adjacent and extends along the fore and aft extending edges of the floor member 16. An angle 120 having a height at least equal to the depth of the hat section is attached to the rear end of the stringers 46 and 48 and extends across the width of the cart. A trapezoidal plate 122 is secured along its upper edge to, and centrally of, the angle 120. The non-parallel edges of the trapezoidal plate 122 may be provided with stiffening flanges 124. A conventional hitch 126 is bolted to the plate 122 and is capable of releaseably securing the tow bar of another cart. The lower end of the plate 122 is stabilized by angled brackets 128 secured between the plate 122 and a cross beam 130 secured to both of the stringers 46 and 48 and to the suspension brackets 132 connecting the stringers to a rigid rear axle 134. Wheels 136 are rotatably mounted on each end of the axle 134. Forces imposed on the hitch 126 by trailing carts as a result of rolling resistance and acceleration, as well as those forces incurred when the tow tractor is braking will be transmitted through the hitch 126 to the stringers 46 and 48 without being transferred to or through either the body 12 or the rear axle 134.

The forward end of the stringers 46 and 48 are attached to a tower assembly 137, preferably forming a truncated pyramidal box section, which includes a lower plate 138. One race of a ball bearing 140, which preferably is of the type disclosed in U.S. Pat. No. 4,316,305, is bolted to the lower plate 138. The other race of the bearing 140 is secured to stacked plates 142 attached between a pair of channels 144 and 146. The plates 142 are secured to an axle 148 with a triangular reinforcing gusset 150 secured between the axle 148 and the lower of plates 142. Wheels 152 are rotatably mounted on each end of the axle 148 and support the cart 10 on the ground. The bearing 140 is centered on both the axle 148 and the cart body 12 to form a wagon steer arrangement. A tow bar 154 is pivotally mounted by bushings on a rod 156 extending between the channels 144 and 146. A ring 158 attached at the free end of the tow bar permits attachment to the hitch of a tow tractor or another cart.

The tow bar 154 applies a parking brake when raised to the park position shown in FIGS. 1 and 2 and releases the brake when lowered to a tow position. The brake comprises a pair of links 160 and 162 which are pivotally attached to the channels 144 and 146 respectively. A heavy angle 164 is secured to the links 160 and 162 and extends beyond the links so that the ends are positioned behind the tires of wheels 152, which tires preferably are of the solid or semi-solid type. Pad elements 166 are attached to the ends of the angle 164 for engagement with the tires. A rod 168 extends through a hole in the angle 164 and openings through the axle 148 and is pivotally attached by pin 170 to an arm 172 secured to the tow bar 154 to form a bell crank therewith. A compression spring 174 is trapped on the other end of the rod 168 between a loosely carried washer 176 too large to pass through the hole in angle 164 and a washer 178 abutting a nut 180 engaging the threaded end of the rod 168. When the tow bar 154 is raised to the position shown, the rod 168 is moved to the left forcing the pad elements 166 into engagement with the tires on the wheels 152. When the tow bar 154 is moved to a tow position, the arm 172 moves the rod 168 to the right releasing the brake; the links 160 and 162 being forced away from the tires by a washer 190 welded to the rod and engageable with the angle 164 as the rod 168 is moved to the right. The parking brake has the advantage of simplicity and low cost. There are few parts required and advantage is taken of the long tow bar to apply the brake. This is necessary because no mechanical advantage is provided by the links 160 and 162, which function merely as a means to position the brake pad elements 166 adjacent to or remote from the wheels 152 and to transmit reaction forces to the draft structure. Because there is no mechanical advantage, the spring 174 must have a high spring constant and a large force must be applied to the rod 168 to compress the spring and act the brake. The tow bar 154 provides a long lever arm so that an operator need not exert a large manual force. A conventional, pedal-release latch (not shown) may be provided to hold the tow bar in its park position, as shown in FIG. 7, with the parking brake applied.

The double-walled construction for the floor, roof and end members provides a light weight, durable and yet relatively strong and rigid assembly. Each of these members has the kiss-offs arranged so that the most visible surfaces are smooth, i.e., the roof and end members have the kiss-offs on their inner walls, while the lower wall of the floor member contains the kiss-offs. Thus, the upper surface of the floor is smooth which is necessary for efficient loading and unloading of luggage and the like, and maintains an attractive appearance because there are no kiss-off depressions on the upper surface to accummulate dirt and debris. The outer surfaces of the roof and end member are also smooth with an attractive appearance. The inner surfaces of these members will, of course, be indented. Should a smooth appearance on the interior be desired, complementary-shaped plugs may be positioned in each of the kiss-offs and retained therein with an adhesive, for example.

The cart body may be shipped in a knocked down or un-assembled condition; the various parts being arranged and packaged in a much smaller volume than when fully assembled, thereby reducing shipping costs. The assembly procedure is relatively simple. The floor member 16 is positioned on the undercarriage 14, and the plugs 62 inserted in kiss-throughs 56. The bolts 64 are inserted and loosely engaged with the nuts 66. The end members 18 and 20 are each assembled to the floor member 16 with the tongues on each end thereon engaging the grooves in the end members. The plugs 76 are inserted in the kiss-throughs and the fasteners loosely tightened. The shelf is installed by inserting the tubes 114 and 115 in the sockets by elastically deforming the end members sufficiently to permit insertion. The spacers 40 are then inserted in the kiss-offs 28 and the roof member 22 is then assembled to the end members with the roof tongues engaging the grooves in the end members. The fasteners with the undercarriage are then tightened fastening the floor and end members thereto, with care taken that the end members are fully seated against the floor member. The fasteners are then inserted and tightened in the roof member. Since there will be tolerance variations in the various plastic members, it is desirable to accommodate those variations in the final roof connection. By slotting the inner extensions 35 and then drilling through the outer wall of the tongue 30 and the outer extension 33, using the hole through the spacer 40 as a guide, the bolts 38 can then be dropped through the resulting aligned holes with the lower washer bridging the slot and the nuts 42 tightened to secure the body together as a unit.

Although the best mode contemplated for carrying out the present invention has been shown and described herein, it will be apparent that modifications and variations may be made without departing from the spirit of the invention as defined by the scope of the appended claims.

I claim:

1. A baggage cart intended to be selectively coupled to other carts to form a train of carts, the baggage cart comprising:
   a. a body including:
      a plastic floor having outer edges,
      a plastic roof,
      a pair of plastic end walls capable of mating and interlocking with said floor and roof, and
      fastening means for securing said ends walls to said floor and roof; and
   b. an undercarriage supporting said body, said undercarriage including:
      stringer means extending substantially the length of said body and capable of attachement thereto, said stringer means including a pair of metal members positioned parallel to each other, each of said metal members having a substantially U-shaped cross section with an inner flange extending toward and an outer flange extending away from the other of said metal members, said outer flanges terminating in a downward extending lip positioned under one of said outer edges of said floor,
      a tower assembly secured to said stringer means,
      a steerably front axle assembly disposed beneath said tower assembly,
      a bearing member interconnecting said tower assembly and said front axle assembly such that said front axle assembly is rotatable relative to said tower assembly,
      a tow bar pivotally secured to said front axle assembly,
      a rear axle assembly attached to said stringer means, and
      a hitch attached to said stringer means and capable of releasably securing one of the other carts.

2. A baggage cart intended to be selectively coupled to other carts to form a train of carts, the baggage cart comprising:
   a. a body including:
      a double-walled plastic floor having a pair of longitudinal floor ends,
      a double-walled plastic roof having a pair of longitudinal roof ends, said plastic roof being disposed above said floor in a spaced relation thereto,
      a pair of double-walled plastic end members, each of said end members being disposed adjacent one of said longitudinal floor ends and one of said longitudinal roof ends, each of said end members having integral lower and upper extension portions extending toward and being capable of mating with said adjacent longitudinal floor end and said longitudinal roof end, respectively, and each of said end members including a plurality of sockets formed therein;
   b. an undercarriage including:
      stringer means extending substantially the length of said body and capable of attachment thereto,
      a tower assembly secured to said stringer means,
      a steerable front axle assembly disposed beneath said tower assembly,
      a bearing member interconnecting said tower assembly and said front axle assembly such that said front axle assembly is rotatable relative to said tower assembly,
      a tow bar pivotally secured to said front axle assembly,
      a rear axle assembly attached to said stringer means, and
      a hitch attached to said stringer means and capable of releasably securing one of the other carts;
   c. fastener means for securing said upper and lower extension portions to said roof and said floor, respectively;
   d. a plurality of metal tubes inserted into and extending between a complementary socket in each of said end members; and
   e. a plastic shelf extending over and being supported by said tubes.

* * * * *